United States Patent
Hasegawa et al.

(10) Patent No.: US 6,811,868 B2
(45) Date of Patent: Nov. 2, 2004

(54) CERAMIC BODY AND CERAMIC CATALYST BODY

(75) Inventors: Jun Hasegawa, Hekinan (JP); Tomomi Hase, Kariya (JP); Kazuhiko Koike, Okazaki (JP); Miho Ito, Hoi-gun (JP)

(73) Assignee: Denso Corporation, Aichi-Pref. (JP)

( * ) Notice: Subject to any disclaimer, the term of this patent is extended or adjusted under 35 U.S.C. 154(b) by 0 days.

(21) Appl. No.: 10/455,390

(22) Filed: Jun. 6, 2003

(65) Prior Publication Data

US 2003/0228457 A1 Dec. 11, 2003

(30) Foreign Application Priority Data

Jun. 6, 2002 (JP) ........................................ 2002-165639

(51) Int. Cl.$^7$ ........................... B32B 18/00; B01J 23/00
(52) U.S. Cl. ................... 428/325; 428/329; 428/330; 428/331; 428/332; 428/210; 428/697; 428/698; 428/699; 428/701; 428/702; 501/134; 501/135; 501/88; 501/89; 501/92; 501/97.1; 501/97.2; 501/97.3; 501/97.4; 501/103; 501/104; 501/105; 501/108; 501/123; 502/317; 502/326; 502/327; 502/439
(58) Field of Search ................................ 428/325, 329, 428/330, 331, 332, 210, 697–699, 701–702; 502/317, 326–327, 439; 501/134–135, 88–89, 92, 97.1–97.4, 103–105, 108, 123

(56) References Cited

FOREIGN PATENT DOCUMENTS

| EP | 1 043 067 A2 | 10/2000 |
|---|---|---|
| JP | 5-50338 | 7/1993 |
| JP | 2001-310128 | 11/2001 |

*Primary Examiner*—Deborah Jones
*Assistant Examiner*—Ling Xu
(74) *Attorney, Agent, or Firm*—Nixon & Vanderhye P.C.

(57) ABSTRACT

The object of the present invention is to provide a ceramic body that can support a required amount of a catalyst component, without lowering the characteristics such as strength, being manufactured without forming a coating layer and providing a high performance ceramic catalyst that is excellent in practical utility and durability.

A noble metal catalyst is supported directly on the surface of the ceramic body and the second component, consisting of compound or composite compound of element having d or f orbit in the electron orbits thereof such as W, Co, Ti, Fe, Ga and Nb, is dispersed in the first component made of cordierite or the like that constitutes the substrate ceramic. The noble metal catalyst can be directly supported by bonding strength generated by sharing the d or f orbits of the second component, or through interaction with the dangling bond that is generated in the interface between the first component and the second component.

15 Claims, 2 Drawing Sheets

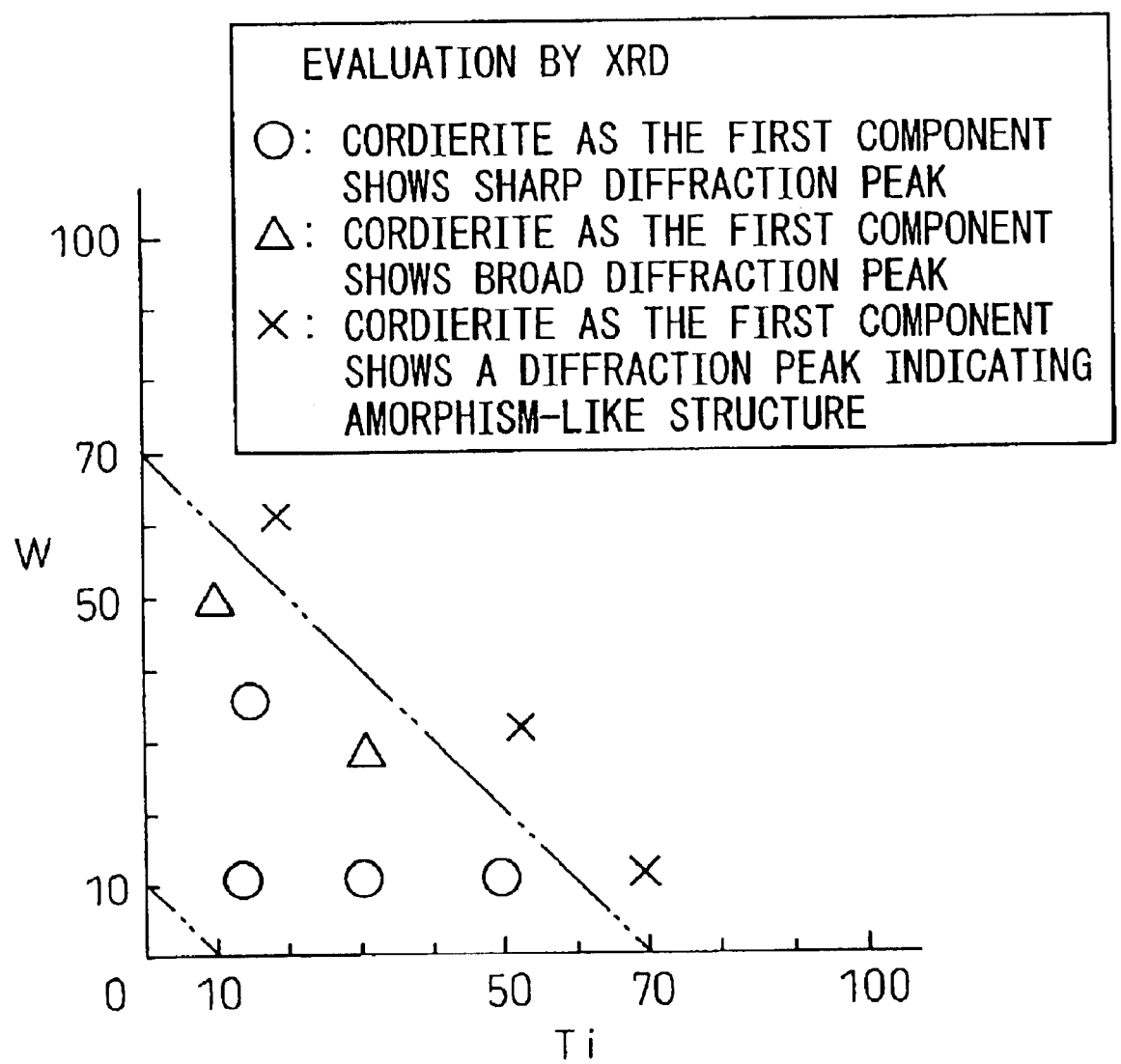

CERAMIC BODY AND CERAMIC CATALYST BODY

BACKGROUND OF THE INVENTION

1. Field of the Invention

The present invention relates to a ceramic body used as a catalyst support in an exhaust gas purifying catalyst of an automobile engine or the like, and a ceramic catalyst body.

2. Description of the Related Art

Cordierite, that has high durability against thermal shock, has been widely used as a ceramic body for a catalyst support. The catalyst is made by applying γ-alumina coating to the surface of cordierite that is formed in honeycomb shape, and by providing it with a noble metal catalyst supported thereon. The coating layer is formed because the specific surface area of the cordierite is too small to support a required amount of catalyst component. Thus the surface area of the support is increased by using γ-alumina that has a large specific surface area.

When the surface of the support is coated with γ-alumina, however, the heat capacity of the support increases due to the increase in the mass. Recently, investigations have been conducted to find the means to decrease the heat capacity by making the cell wall of the honeycomb support thinner, in order to achieve earlier activation of the catalyst. However, the effect of this attempt is reduced by the formation of the coating layer. There have also been such problems that the coefficient of thermal expansion of the support becomes larger due to the presence of the coating layer, and that the decrease in the opening area of the cell increases the pressure loss.

Various researches have been conducted to achieve ceramic bodies capable of supporting catalyst components without forming a coating layer. For example, Japanese Examined Patent Publication (Kokoku) No. 5-50338 proposes a method that increases the specific surface area of cordierite itself by applying heat treatment after pickling process. However, this method has not been practical because a pickling process or a heat treatment causes the destruction of the crystal lattice of cordierite, thus resulting in lower mechanical strength.

Accordingly, the present invention aims at solving the problems of the prior art described above, and providing a ceramic body capable of supporting, without forming a coating layer, a required amount of catalyst component, without lowering characteristics such as mechanical strength, thereby to provide a high performance ceramic catalyst that is excellent in practical utility and durability.

SUMMARY OF THE INVENTION

A first aspect of the invention is a ceramic body that is capable of supporting catalyst components directly on the surface thereof, and comprises a first component that constitutes a substrate ceramic and a second component that is different from the first component, wherein the second component is dispersed at least in a skin portion of the substrate ceramic.

The ceramic body of the present invention is made capable of supporting catalyst components directly thereon by dispersing the second component, that is different from the first component, in at least the skin portion of the substrate ceramic. Consequently, the problem of destruction of the crystal lattice resulting in lower mechanical strength does not occur, unlike the prior art that increases the specific surface area of the substrate ceramic by eluting the constituent components by a pickling process or the like. As a result, the ceramic body can directly support the catalyst component while maintaining a sufficient strength, and is excellent in practical utility and durability, without forming a coating layer.

Specifically, the catalyst component is supported on the second component or in an interface between the first component and the second component. When a compound including an element, that has higher strength of bonding with the catalyst component than the first component, is introduced as the second component, for example, the catalyst component can be directly supported with a strong adsorbing force. The interface between the first component and the second component includes a lattice mismatch that may generate such defects as a kink or a plate. Such a portion involves a dangling bond that can easily result in bonding with the catalyst component. As a result, as the catalyst supporting performance becomes higher and the catalyst component can be dispersed more uniformly in the support than in the case of the conventional support structure where catalytic metal particles are supported in pores, the catalyst component is less likely to coagulate and deteriorate over a long period of use.

For the first component that makes the substrate ceramic, ceramic materials such as cordierite, $Al_2O_3$, SiC, $TiO_2$, MgO, $Si_2N_4$, $ZrO_2$, $CeO_2$, or $SiO_2$ may be used. Depending on the application and the characteristics of the substrate ceramic required by the operating environment, one or several kinds selected from the ceramic materials mentioned above may be used.

The content of the second component in the ceramic body as a whole is set so that total number of atoms of metal elements that constitute the second component falls within a range from 0.1 to 70 atomic % of the total number of atoms of metal elements that constitute the first component and the second component. With the second component dispersed in the ceramic body as a whole in a proportion within the range described above, it is possible to support the required quantity of catalyst component while maintaining the characteristics of the substrate ceramic.

The content of the second component in the skin portion is preferably set so that total number of atoms of the metal elements that constitute the second component falls within a range from 0.1 to 100 atomic % of the total number of atoms of the metal elements that constitute the first component and the second component. With the content of the second component made higher in the skin portion, it is made possible to support a greater quantity of catalyst component while maintaining the characteristics of the substrate ceramic.

Moreover, the second component is preferably a compound of one or more elements having d or f orbits in the electron orbits thereof, or a composite compound of a metal element included in the first component and one or more elements having d or f orbits in the electron orbits thereof. Since elements having d or f orbits have energy levels close to that of the catalyst component, they easily donate electrons so as to form bonding. The second component may also be a compound of element having d or f orbit and the metal element included in the first component.

Furthermore, the second component may also be a compound of one or more element selected from among W, Co, Ti, Fe, Ga and Nb, or a composite compound of the metal element included in the first component and one or more element selected from among W, Co, Ti, Fe, Ga and Nb.

The compound or the composite compound mentioned above is preferably one or more kind selected from among $WO_3$, $MgWO_4$, $CoWO_4$, $Mg_2TiO_5$, $MgTiO_3$, $Mg_2TiO_4$, $MgSiO_3$, $MgWO_4$, $MgAl_2O_3$, $TiO_2$, $FeWO_4$, $MgFe_2O_4$, $FeAlO_3$, $Fe_2SiO_4$, $MgAl_2O_4$, $Al_2TiO_5$, $GaAlO_3$, $Nb_2WO_3$, and $AlNbO_4$.

The mean particle size of the second component is preferably 50 $\mu m$ or less. Dispersing the second component having a small particle size densely in the skin portion of the ceramic body enables it to increase the quantity of catalyst component supported therein.

The shape of the ceramic body may be selected from among various shapes such as honeycomb, foamed block, hollow fiber, fiber, powder or pellets. With any such shape, it is made possible to directly support the catalyst component by adding the second component.

A second aspect of the invention is a ceramic catalyst made by directly supporting the catalyst component on the ceramic body described above. As the ceramic catalyst supports the catalyst component directly thereon and does not need a coating layer, there occurs no increase in the thermal capacity and in thermal expansion coefficient due to coating layer. The catalyst can also be activated earlier and has high durability.

Moreover, in the ceramic catalyst of the present invention, the catalyst component is supported on the second component or in the interface between the first component and the second component. When the second component includes an element that has d or f orbit in the electron orbits thereof, for example, bonding with the catalyst component is made easier. The interface between the first component and the second component is likely to involve a dangling bond formed therein, which also makes it easier to form bonding with the catalyst component.

Furthermore, the ceramic catalyst of the present invention employs the catalyst that includes noble metal as the catalyst component. Specifically, one or more element selected from among Pt, Rh, Pd, Ru, Au, Ag, Ir and In may be used according to the purpose.

In the ceramic catalyst of the present invention, the mean particle size of the catalyst component is preferably set to 100 nm or less. The smaller the particle size, the more closely the catalyst component can be dispersed, resulting in an improved catalyst performance.

BRIEF DESCRIPTION OF THE DRAWINGS

FIG. 2 shows the result of investigating the effect of variation in the content of the second component on the microscopic structure of the first component.

DESCRIPTION OF THE PREFERRED EMBODIMENTS

Figure 1A:
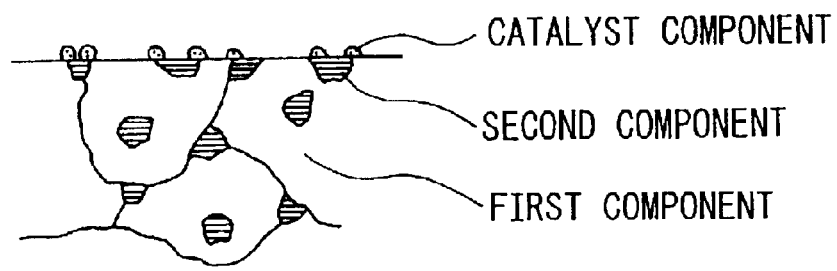
FIGS. 1(a) to 1(c) show the microscopic structure of the ceramic catalyst of the present invention.

The present invention will be described in detail below. The ceramic body of the present invention comprises a first component that constitutes a substrate ceramic and a second component that is different from the first component, wherein the second component is dispersed at least in a skin portion of the substrate ceramic so as to support the catalyst component directly on the surface thereof. The catalyst component can be supported through bonding with the second component that is dispersed in the substrate ceramic, or through interaction with the dangling bond that is present in the interface between the first component and the second component. There is no limitation to the shape of the ceramic body which may be selected from among various shapes such as honeycomb, foamed block, hollow fiber, fiber, powder and pellets. The ceramic body of the present invention is used as a catalyst support, and the ceramic catalyst body made by supporting a catalyst component directly on the ceramic body is used, for example, in an exhaust gas purifying catalyst of an automobile engine or the like.

The first component that constitutes the substrate ceramic may be cordierite having theoretical composition of $2MgO.2Al_2O_3.5SiO_2$, or a ceramic material such as $Al_2O_3$, SiC, $TiO_2$, MgO, $Si_3N_4$, $ZrO_2$, $CeO_2$, or $SiO_2$. Depending on the application and the required characteristics of the substrate ceramic, one or more kinds selected from among the ceramic materials mentioned above may be used. The substrate ceramic that uses cordierite as the first component, for example, has high thermal shock resistance and is therefore suitable for a support for an exhaust gas purification catalyst that is required to be durable against a high temperature.

For the second component, a compound is preferably used that includes an element which has higher strength of bonding with the supported catalyst component than the metal element constituting the first component of the substrate ceramic (Si, Al and/or Mg in the case of cordierite) and is capable of chemically bonding with the catalyst component. Specific examples of such elements are those having d or f orbits in the electron orbits thereof, and elements having empty orbit in the d or f orbit are preferably used. An element that has empty orbit in the d or f orbit has energy level close to that of the catalyst component, such as noble metal, which is supported, and easily donates an electron. An element that has two or more states of oxidation, too, easily donates electron so as to form bonding with the catalyst component.

Elements that have an empty orbit in the d or f orbit thereof include such elements as Sc, Ti, V, Cr, Mn, Fe, Co, Ni, Y, Zr, Nb, Mo, Tc, Ru, Rh, La, Ce, Pr, Nd, Pm, Sm, Eu, Gd, Tb, Dy, Ho, Er, Tm, Lu, Hf, Ta, W, Re, Os, Ir and Pt. Among these elements, Ti, V, Cr, Mn, Fe, Co, Ni, Nb, Mo, Tc, Ru, Rh, Ce, Pr, Eu, Tb, Ta, W, Re, Os, Ir and Pt have two or more states of oxidation. One or more element selected from among Ti, V, Cr, Mn, Fe, Co, Ni, Zr, Mo, Ru, Rh, Ce, W, Ir and Pt is preferably used, and more preferably one or more element selected from among W, Co, Ti, Fe, Ga and Nb is used.

The second component is constituted from a compound, typically an oxide, of an element having empty orbit in the d or f orbit. The second component may also be constituted from a composite compound such as a composite oxide that includes a plurality of elements having an empty orbit in the d or f orbits. One or more kinds of such compound or composite compound is dispersed in the substrate ceramic. Moreover, the second component may also be a composite oxide of an element having an empty orbit in the d or f orbits described above and a metal element included in the first component. For example, when the stock material for the first component, with a material that includes an element having an empty orbit in the d or f orbits added thereto, is fired in air atmosphere, there may be formed in the process a solid solution of the element that constitutes the first component and the element having an empty orbit in the d or f orbits. As this solid solution also includes the element that has empty orbit in the d or f orbit, a high strength of bonding with the catalyst described above is provided.

As described above, the second component is constituted from a compound or a composite compound that includes at least one element having an empty orbit in the d or f orbits, or a composite compound of at least one element having an empty orbit in the d or f orbits and at least one kind of metal element included in the first component. It need not be said that the second component may also include two or more kinds of compounds or composite compounds as the constituent components thereof. For example, if the first component is cordierite that includes Si, Al and/or Mg, and the element having empty orbit in the d or f orbit included in the second component is one or more element selected from among W, Co, Ti, Fe, Ga and Nb, the compound or composite compound that constitutes the second component may specifically be $WO_3$, $MgWO_4$, $CoWO_4$, $Mg_2TiO_5$, $MgTiO_3$, $Mg_2TiO_4$, $MgSiO_3$, $MgWO_4$, $MgAl_2O_3$, $TiO_2$, $FeWO_4$, $MgFe_2O_4$, $FeAlO_3$, $Fe_2SiO_4$, $MgAl_2O_4$, $Al_2TiO_5$, $GaAlO_3$, $Nb_2WO_3$, or $AlNbO_4$, and one or more kind selected from among these compounds and composite compounds may be used.

The content of the second component in the ceramic body as a whole is set so that total number of atoms of metal elements that constitute the second component falls within a range from 0.1 to 70 atomic %, preferably from 10 to 70 atomic % of the total number of atoms of metal elements that constitute the first component and the second component. When the total number of atoms of metal elements that constitute the second component is less than 0.1 atomic %, there is an insufficient number of sites where the catalyst component can be supported. When the total number of atoms of metal elements that constitute the second component is more than 70 atomic %, the required characteristics of the substrate ceramic (first component) will be lost, which is undesirable. Accordingly, the content of the second component is determined so that the required quantity of catalyst can be supported without lowering the mechanical properties, such as strength and thermal expansion coefficient, and other characteristics such as heat resistance and weatherability.

The above discussion does not apply to the skin portion where the catalyst component is supported, and the content of the second component can be increased in this portion. Specifically, the content is set so that total number of atoms, of metal elements that constitute the second component, falls within a range from 0.1 to 100 atomic %, preferably from 10 to 100 atomic % of the total number of atoms of metal elements that constitute the first component and the second component. As the required characteristics of the support can be ensured by setting the content of the second component in the substrate to 70 atomic % or less, the required characteristics of the substrate ceramic (first component) will not be lost even when the content of the second component in the skin portion exceeds 70 atomic %, thereby providing the advantage of greater quantity of catalyst supported due to increased content of the second component. The second component may be provided in the form of a coating layer that covers the surface, in which case the content of the second component is 100 atomic %. The skin portion refers to the portion about several micrometers deep from the surface of ceramic body.

The mean particle size of the second component is preferably set to 50 μm or less. The use of a second component that has smaller mean particle size and is highly dispersed in the ceramic body increases the number of sites where the catalyst component can be supported and increases the quantity of the catalyst component that can be supported.

The ceramic body of the present invention can be manufactured, for example, as follows. When preparing the material to make the first component that constitutes the substrate ceramic, a predetermined amount of powder of the second component or a material that produces the same is added and other materials are mixed, molded and dried, before being degreased and fired in air atmosphere. This process enables it to disperse the particles of the second component uniformly in the first component. The stock material for the second component may also be mixed in the state of solution. If the second component is $WO_3$, for example, an aqueous solution of silicotungstic acid may be used as the stock material. If the second component is $TiO_2$, an aqueous solution of peroxotitanic acid, aqueous solution of titanium tetrachloride or the like may be used, so that more uniform mixing can be achieved.

For the catalyst component supported by the ceramic support that has been formed as described above, for example, one or more kind selected from among noble metal elements such as Pt, Rh, Pd, Ru, Au, Ag, Ir and In may be preferably used. Mean particle size of the noble metal catalyst is preferably 100 nm or smaller. Purifying power per unit weight of catalyst can be increased by making the mean particle size to 100 nm or smaller. Various promoter catalysts may also be added as required. The promoter may be a metal element such as Hf, Ti, Cu, Ni, Fe, Co, W, Mn, Cr, V, Se, Rb, Sr, Y, Zr, Nb, Mo, Tc, Ru, Sc, Ba, Ka, or a lanthanoid element (La, Ce, Pr, Nd, Pm, Sm, Eu, Gd, Tb, Dy, Ho, Er, Tm, Yb, Lu), or an oxide or a composite oxide thereof. One or more of these elements may be used in accordance to the purpose such as mitigating the deterioration, providing oxygen absorbing capacity and monitoring the deterioration of catalyst.

In order to have the catalyst component supported on the ceramic body of the present invention, usually, the ceramic body is immersed in a solution that includes the desired catalyst component, and is then dried and fired. If two or more kinds of catalyst component are used in combination, the ceramic body may be immersed in a solution that includes the plurality of catalyst components. When Pt and Rh are used as the main catalyst components, for example, a solution including hexachloroplatinic acid and rhodium chloride may be used. The Quantity of the catalyst component supported per unit volume is preferably from 0.05 to 10 g/L for a noble metal catalyst, and from 1 to 250 g/L for a promoter catalyst.

Figure 1B:
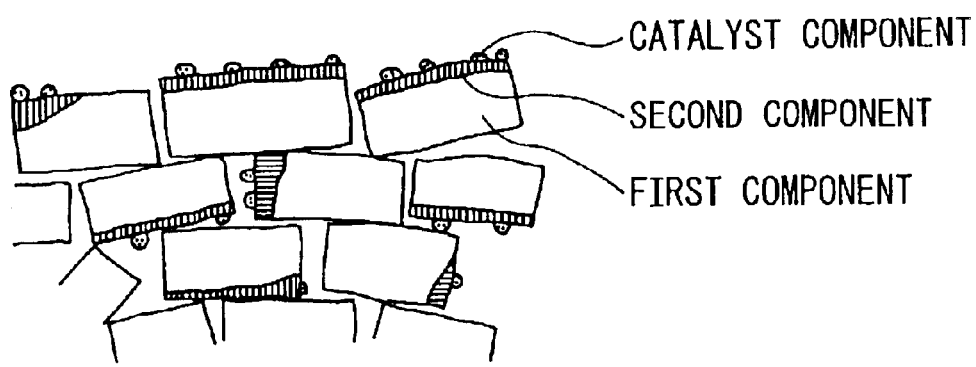
Figure 1C:
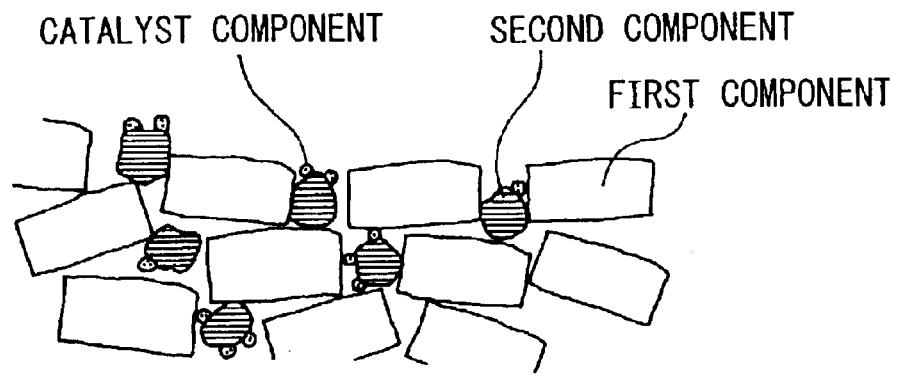

Through the process described above, the ceramic catalyst having the catalyst component supported on the second component or in the interface between the first component and the second component is obtained as shown FIGS. 1(a) to 1(c). FIG. 1(a) shows that a structure of the first component is polycrystalline with the second component being dispersed in the grain boundary and in the grains. FIG. 1(b) shows that a structure of the first component is substantially formed in single crystals and is integrated with the second component. FIG. 1(c) shows that a sintered structure of the first component is. substantially formed in single crystal or polycrystalline structure while the second component exists independently. In any of these structures, the noble metal element or other catalyst component is directly supported by a d or f orbit of the element included in the second component that is dispersed in the substrate ceramic and a d or f orbit of the element included in the noble metal element or other catalyst component overlap each other, or through interaction with the dangling bond which has high bonding strength that is generated in the interface between the first component and the second component, thereby causing chemical bonding or adsorption. A lattice mismatch that is present in the interface between the first component and the second component causes a kink or a plate to be produced, thereby making it easy to generate the dangling bond.

Thus, the ceramic catalyst of the present invention directly supports the catalyst component with a high bonding strength on the surface of the second component or in the interface between the first component and the second component. As a result, bonding between the ceramic body and the catalyst metal becomes stronger so that migration and coagulation of the catalyst metal resulting in thermal deterioration due to thermal vibration can be effectively suppressed, compared to methods where the catalyst is supported physically in pores, micro cracks or the like. The ceramic catalyst is preferably used in an exhaust gas purifying catalyst of an automobile engine or the like, and is effective in decreasing the heat capacity, coefficient of thermal expansion and pressure loss, because the catalyst component can be supported directly on the surface without forming a coating layer from alumina or the like.

EXAMPLES

The ceramic body of the present invention was manufactured according to the method described above, by using cordierite as the first component that constituted the substrate ceramic, and dispersing tungsten oxide ($WO_3$) and titania ($TiO_2$) as the second component. The content of the second component was set so that proportion of W of $WO_3$ that constituted the second component was in a range from 10 to 30 atomic % and proportion of Ti of $TiO_2$ was in a range from 10 to 60 atomic % of the total content of the metal elements (Al, Mg, Si) that constitute the cordierite and the metal elements (w and Ti) that constitute the second component. First, $WO_3$ powder having mean particle size of 1 $\mu$m and $TiO_2$ powder having mean particle size of 30 nm were added in proportions falling in the ranges described above to the cordierite material consisting of talc, kaolin, alumina, etc. The mixture was subjected to ordinary wet mixing process and molded into a preform of honeycomb shape. The preform was dried, degreased at 900° C. in an air atmosphere, and was then heated, at a rate of 5° C./hr to 75° C./hr, and fired at a temperature in a range from 1200 to 1350° C.

The constitution of the ceramic body obtained as described above was studied by X-ray diffraction analysis. Besides the diffraction peak of cordierite that constituted the first component, peaks of $WO_3$ and $TiO_2$ were observed. Thus it was verified that the ceramic body of the present invention was obtained wherein the second component of $WO_3$ and $TiO_2$ were dispersed in the first component of cordierite.

FIG. 2 shows the result of investigating the effect of the content (atomic %) of W and Ti that are metal elements included in the second component on the structure of cordierite. As can be seen from the graph, the diffraction peak of cordierite is sharp in a region where the total amount of W and Ti is not higher than 50 atomic %, and is broader in a region where the total amount of W and Ti is around 70 atomic %, while the cordierite takes an amorphism-like form when the content exceeds 70 atomic %. This means that, when $WO_3$ and $TiO_2$ are dispersed as the second component in the first component made of cordierite, total amount of the metal elements included in the second component is preferably set to 70 atomic % or less, which enables it to mitigate the influence on the characteristics of the substrate ceramic constituted from the first component.

The Pt catalyst component was supported on the ceramic body that included $WO_3$ and $TiO_2$ dispersed therein as described above, by immersing the ceramic body in a solution including hexachloroplatinic acid. After drying, the ceramic body was fired in air atmosphere thereby to obtain the ceramic catalyst. Bonding energy of W on the ceramic catalyst was measured by XPS before and after depositing Pt. The measurement showed that the diffraction peak of W changed as the Pt was supported, indicating a change in the bonding condition of W caused by the catalyst component being supported. Similarly, measurement of the bonding energy of Ti before and after depositing Pt showed that the bonding energy shifted due to the support of Pt. In contrast, no change was observed in the bonding energy of Si, Al and Mg that constituted the cordierite.

ICP analysis of the ceramic catalyst showed that 1.2 g/L of Pt was supported on the ceramic catalyst, while only 0.02 g/L was supported on the ceramic body constituted only from cordierite without the second component. Thus it was verified that catalyst supporting capability was greatly increased by dispersing the second component. This means that the ceramic catalyst of the present invention has an increased bonding strength between the noble metal catalyst and ceramic body due to the presence of W and Ti.

What is claimed is:

1. A ceramic body capable of supporting catalyst components directly on the surface thereof, comprising a first component that constitutes a substrate ceramic and a second component that is different from said first component, wherein said second component is dispersed at least in a skin portion of said substrate ceramic.

2. The ceramic body according to claim 1, wherein said catalyst component is supported on said second component or in the interface between said first component and said second component.

3. The ceramic body according to claim 1, wherein said first component comprises at least one kind selected from among cordierite, $Al_2O_3$, SiC, $TiO_2$, Mgo, $Si_3N_4$, $ZrO_2$, $CeO_2$, and $SiO_2$.

4. The ceramic body according to claim 1, wherein the content of said second component in the ceramic body as a whole is set so that total number of atoms of metal elements that constitute said second component is in a range from 0.1 to 70 atomic % of the total number of atoms of metal elements that constitute said first component and said second component.

5. The ceramic body according to claim 1, wherein the content of said second component in said skin portion is set so that total number of atoms of metal elements that constitute said second component is in a range from 0.1 to 100 atomic % of the total number of atoms of metal elements that constitute said first component and said second component.

6. The ceramic body according to claim 1, wherein said second component is a compound of one or more elements having a d or f orbit in the electron orbits thereof, or a composite compound of metal element included in said first component and one or more elements that have a d or f orbit in the electron orbits thereof.

7. The ceramic body according to claim 1, wherein said second component is a compound of one or more elements selected from among W, Co, Ti, Fe, Ga and Nb, or a composite compound of the metal element included in said first component and one or more element selected from among W, Co, Ti, Fe, Ga and Nb.

8. The ceramic body according to claim 1, wherein said compound or composite compound is one or more kinds selected from among $WO_3$, $MgWO_4$, $CoWO_4$, $Mg_2TiO_5$, $MgTiO_3$, $Mg_2TiO_4$, $MgSiO_3$, $MgWO_4$, $MgAl_2O_3$, $TiO_2$, $FeWO_4$, $MgFe_2O_4$, $FeAlO_3$, $Fe_2SiO_4$, $MgAl_2O_4$, $Al_2TiO_5$, $GaAlO_3$, $Nb_2WO_3$, and $AlNbO_4$.

9. The ceramic body according to claim 1, wherein mean particle size of said second component is 50 μm or smaller.

10. The ceramic body according to claim 1, wherein shape of the ceramic body may be selected from among various shapes such as honeycomb, foamed block, hollow fiber, fiber, powder or pellets.

11. A ceramic catalyst made by supporting a catalyst component directly on the ceramic body of claim 1.

12. The ceramic catalyst according to claim 11, wherein said catalyst component is supported on said second component or in the interface between said first component and said second component.

13. The ceramic catalyst according to claim 11, wherein said catalyst component includes noble metal element.

14. The ceramic catalyst according to claim 11, wherein said catalyst component is one or more element selected from among Pt, Rh, Pd, Ru, Au, Ag, Ir and In.

15. The ceramic catalyst according to claim 11, wherein mean particle size of said catalyst component is 100 nm or smaller.

* * * * *